US012686189B2

(12) United States Patent
Djaoued et al.

(10) Patent No.: US 12,686,189 B2
(45) Date of Patent: Jul. 21, 2026

(54) LIQUID THERMOPLASTIC RESIN AND PULTRUSION METHOD

(71) Applicants: Yahia Djaoued, Shippagan (CA); Ihsan Basaran, Shippagan (CA); Bernard Morin, Shippagan (CA); Gabriel LaPlante, Dieppa (CA); Marie Helene Thibault, Shippagan (CA); Maurice Guitton, Lunenburg (CA)

(72) Inventors: Yahia Djaoued, Shippagan (CA); Ihsan Basaran, Shippagan (CA); Bernard Morin, Shippagan (CA); Gabriel LaPlante, Dieppa (CA); Marie Helene Thibault, Shippagan (CA); Maurice Guitton, Lunenburg (CA)

( * ) Notice: Subject to any disclaimer, the term of this patent is extended or adjusted under 35 U.S.C. 154(b) by 124 days.

(21) Appl. No.: 18/622,979

(22) Filed: Mar. 31, 2024

(65) Prior Publication Data

US 2024/0326356 A1     Oct. 3, 2024

Related U.S. Application Data

(60) Provisional application No. 63/456,292, filed on Mar. 31, 2023.

(51) Int. Cl.
B29C 70/52        (2006.01)
B29C 70/54        (2006.01)
(Continued)

(52) U.S. Cl.
CPC .......... B29C 70/521 (2013.01); B29C 70/526 (2013.01); B29C 70/527 (2013.01);
(Continued)

(58) Field of Classification Search
CPC ............ B29C 70/52–528; C08L 33/12; B29K 2033/12; B29K 2105/0005;
(Continued)

(56) References Cited

U.S. PATENT DOCUMENTS 2,787,634 A * 4/1957 Coover, Jr. ............... C07C 7/20
562/598
3,240,830 A * 3/1966 Dye .......................... C07C 7/20
585/824
(Continued)

*Primary Examiner* — Jeffrey M Wollschlager
(74) *Attorney, Agent, or Firm* — Dean A. Craine

(57)        ABSTRACT

A liquid acrylic resin used in reactive thermoplastic pultrusion that produces a nanocomposite/fiber-reinforced hybrid composite structure with relatively high tensile strength and high flexural strength compared to thermoplastic fiber-reinforced composites made using resin transfer molding processes. The resin is made of 70-90% methyl methacrylate, 10-30% polymeric viscosity-promoting agent, a 0.1-10% nano clay, a nitro compound retarder and an internal lubricant. The pultrusion process is carried out in a pultrusion machine that uses a relatively high percentage of fibers. The fibers are submerged in a resin bath and delivered to a curing die. Before manufacturing the resin, the inhibitor for the monomer is removed using an Alumina column and replaced with the nitro retarder. The nano clay is added to promote the reaction rate. Any resin and pultruded wastes produced during the manufacturing process can be processed and reused. Also disclosed is a method for manufacturing a composite made of the liquid acrylic resin and pultrusion dies systems.

5 Claims, 2 Drawing Sheets

(51) Int. Cl.

| | |
|---|---|
| *B29K 33/00* | (2006.01) |
| *B29K 105/00* | (2006.01) |
| *B29K 105/08* | (2006.01) |
| *B29K 105/16* | (2006.01) |
| *B29K 509/02* | (2006.01) |
| *C08L 33/12* | (2006.01) |

(52) U.S. Cl.
CPC .......... *B29C 70/528* (2013.01); *B29C 70/545* (2013.01); *C08L 33/12* (2013.01); *B29K 2033/12* (2013.01); *B29K 2105/0005* (2013.01); *B29K 2105/0827* (2013.01); *B29K 2105/162* (2013.01); *B29K 2509/02* (2013.01)

(58) Field of Classification Search
CPC ...... B29K 2105/0827; B29K 2105/162; B29K 2509/02
See application file for complete search history.

(56) References Cited

U.S. PATENT DOCUMENTS

| | | | | |
|---|---|---|---|---|
| 4,547,619 | A * | 10/1985 | Diaz .......................... | C07C 7/12 |
| | | | | 585/824 |
| 5,098,496 | A * | 3/1992 | Breitigam ............. | B29C 70/521 |
| | | | | 264/237 |
| 5,294,461 | A * | 3/1994 | Ishida ................... | B29C 70/521 |
| | | | | 156/181 |
| 6,288,299 | B1 * | 9/2001 | Nedez .................... | C07B 63/00 |
| | | | | 585/824 |
| 6,339,177 | B1 * | 1/2002 | Bergman ............... | C07B 63/04 |
| | | | | 252/182.29 |
| 2004/0001941 | A1 * | 1/2004 | Kusek ................... | B29C 70/521 |
| | | | | 428/292.1 |
| 2018/0066396 | A1 * | 3/2018 | Ratcliffe ................ | B32B 27/38 |
| 2021/0403653 | A1 * | 12/2021 | Swan ...................... | C08J 3/212 |
| 2022/0388257 | A1 * | 12/2022 | Mansfield ............ | B29C 70/527 |

* cited by examiner

LIQUID THERMOPLASTIC RESIN AND PULTRUSION METHOD

CROSS-REFERENCE TO RELATED APPLICATIONS

This utility patent application is based on and claims the filing date benefit of U.S. Provisional Patent Application (Application No. 63/456,292) filed on Mar. 31, 2023.

FIELD AND BACKGROUND OF THE INVENTION

Field of the Invention

This invention relates to manufacturing stable thermoplastic resins used to make objects made of fibrous material using the pultrusion manufacturing process.

Background of the Invention

Thermoplastic polymer matrices have several advantages over thermoset ones. Thermoplastics can be reshaped and recycled, while thermosets cannot.

Today, thermoset glass fiber-reinforced polymer composites dominate the pultrusion industry. Thermoplastic pultrusion examples are very rare, particularly with acrylic resins. An example of a commercially available acrylic resin used in the pultrusion process is sold under the trademark ELIUM® C595 E). The exact formulation of this acrylic resin is unknown. An older method uses a liquid resin that uses partial polymerization of methyl methacrylate until a certain point, yielding a 20% polymer or oligomer/resin ratio. Every batch can be different in this method because controlling the conversion in free-radical polymerization is not easy. Therefore, variations in resin composition can be observed from batch to batch. Also, NMR analysis is needed to confirm the conversion rate and NMR is not a common instrument in the industry.

U.S. Pat. No. 10,711,117 entitled, COMPOSITE MATERIAL VIA IN-SITU POLYMERIZATION OF THERMOPLASTIC (METH) ACRYLIC RESINS AND ITS USE' teaches a continuous process for forming impregnated prepreg that uses in situ polymerization of a thermoplastic resin with a fibrous material. The thermoplastic resin is a methacrylic resin used in resin transfer molding

SUMMARY OF THE INVENTION

A liquid acrylic resin used in reactive thermoplastic pultrusion that produces a nanocomposite/fiber-reinforced hybrid composite structure with relatively high tensile strength and high flexural strength compared to thermoplastic fiber-reinforced composites made using resin transfer molding processes. The resin comprises 70-90% methyl methacrylate, 10-30% polymeric viscosity-promoting agent, a 0.1-10% nano clay, a nitro compound retarder, and an internal lubricant. The pultrusion process is carried out in a pultrusion machine that uses a relatively high percentage of fibers. The fibers are submerged in a resin bath and delivered to a curing die. Before manufacturing the resin, the inhibitor for the monomer is removed using an Alumina column and replaced with the nitro retarder. The nano clay is added to promote the reaction rate. Any resin and pultruded wastes produced during manufacturing can be processed and reused. A method for manufacturing the nanocomposite/fiber-reinforced hybrid composite using a pultrusion machine is also disclosed.

One advantage of the liquid acrylic resin described above is that it may be used with conventional pultrusion methods for producing thermoset fiber-reinforced materials.

Another advantage of the liquid acrylic resin described above is that it uses lower pultrusion die temperature zones from 60 degrees C. to 110 degrees C.

Another advantage is that the liquid acrylic resin can be prepared before use in advance and stored at room temperature for extended periods.

Another advantage is that the pultruded parts manufactured using the resin described herein can be easily recycled to prepare fresh resin or obtained as a raw polymer that can be used with other polymer matrix-related applications.

Another advantage is that resin waste produced during the pultrusion can be stored for another pultrusion, can be polymerized to obtain raw PMMA that can be useful for any polymer matrix-related applications.

Using the above-described liquid acrylic resin, two embodiments of the pultrusion systems are also described in which braided composite fibers are delivered one of two types of pultrusion dies. In the first pultrusion system, braided composite fibers are delivered to a resin bath containing the liquid acrylic resin, in which the inhibitor is replaced with a nitro retarder and mixed with a polymerization initiator. Wet fibers exit the resin bath and enter the ingress port on the pultrusion die. The pultrusion die includes a longitudinally aligned compression mold cavity with sequentially aligned die heaters that gradually heat and cool, causing the wet fibers to undergo polymerization. The system includes pullers that pull the wet and cured composite fibers through the pultrusion die and cutters that cut the cured composite fibers into a desired length.

In a second embodiment, the resin bath is replaced with a resin tank containing the liquid acrylic resin containing nitro retarder and polymerization initiator which is delivered to an injection cavity formed inside the injection pultrusion die. The pultrusion die is modified and includes an internal injection cavity where the resin impregnates the braided fibers. Like the first embodiment of the pultrusion system, the pultrusion die includes a longitudinally aligned compression mold cavity, and a plurality of sequentially aligned die heaters that gradually heat and cool the wet fibers in the mold cavity to optimize polymerization. The system includes pullers that pull the wet and cured composite fibers through the protrusion die and cutters that cut the cured composite fibers into a desired length.

In the first pultrusion system, one or more control panels or software programs control the temperatures of the die heaters and the pulling speed of the pullers and the cutters. In the second pultrusion system, the same or additional control panels or software programs control the amount and flow rate of resin into the injection chamber.

DETAILED DESCRIPTION OF THE INVENTION

The components of the resin are monomer (inhibitor-free), polymeric viscosity-promoting agent, nano clay, a retarder (for unwanted self-polymerization when storing a long time). Monomer, methyl methacrylate (MMA) is the highest portion of the composition of this liquid resin. The weight ratio of the MMA can be between 70-90%. Better results with 70-80%. One of the main components is a polymeric viscosity-promoting agent, which can be polymethyl methacrylate (PMMA), and the weight ratio can be between 10 to 30% to the resin weight. PMMA's molecular weight can be between 50 kDa to 400 kDa, better between 100 kDa-150 kDa. Nano clay can be plain Montmorillonite or organically modified. Organically modified gives better results. The weight ratio of the nano clay can be between 0.1% to 3.0%. Retarder can be a nitro compound that has the ability to slow self-polymerization to promote shelf-life and can be used in a ratio of 50-1000 ppm in the resin. The most convenient results were obtained with the composition of 29.7% PMMA, 1.0% nano clay, and 69.3% methyl methacrylate. Retarder concentration at 100 ppm provides a satisfactory shelf-life increase.

The monomer's inhibitor is removed by passing it through an Alumina column. The best order for mixing the compounds is MMA-retarder-PMMA-nano clay.

Figure 1:
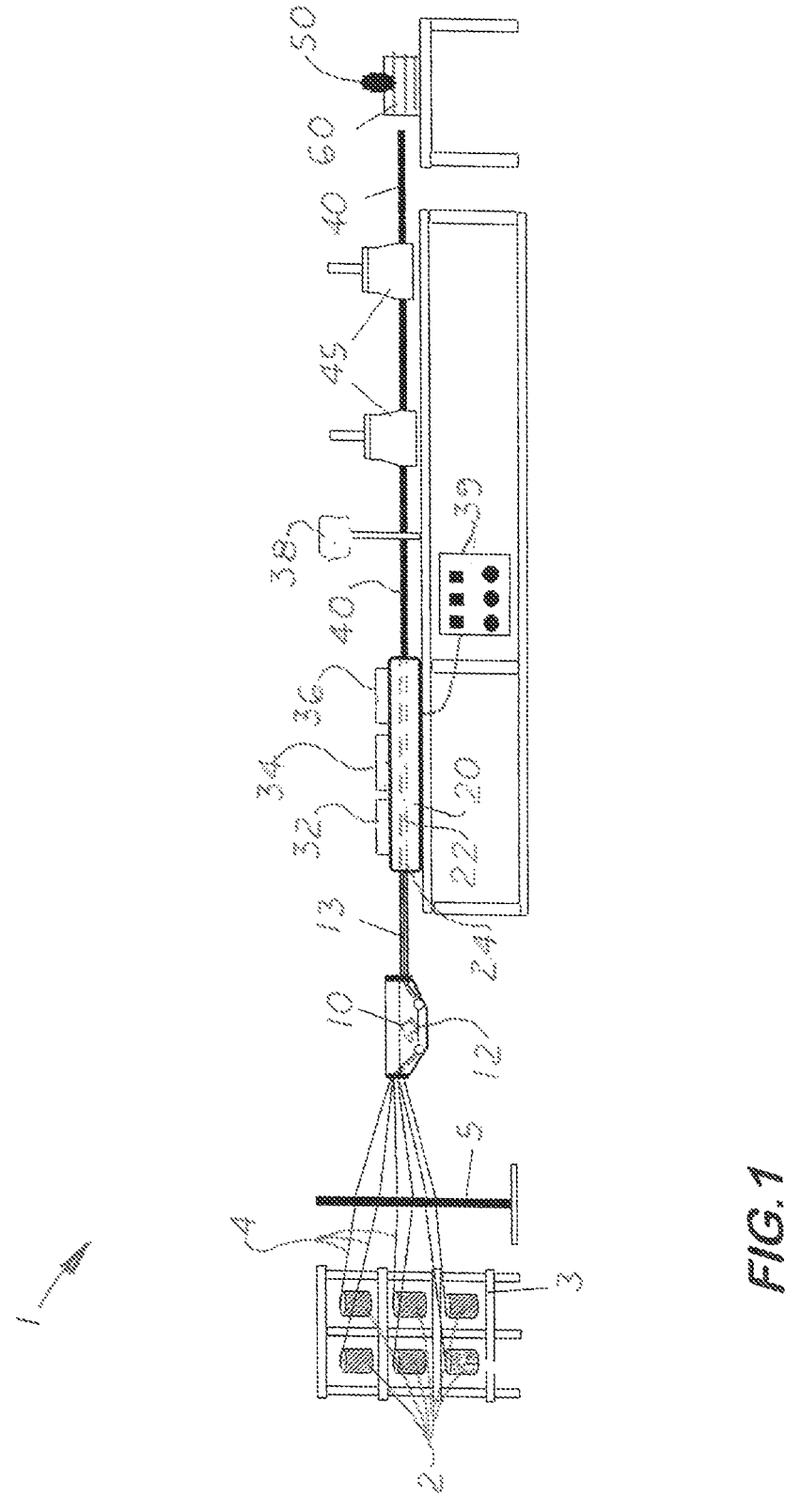
FIG. 1 illustrates a pultrusion system in which composite fibers are braided together, delivered to a resin bath containing the liquid acrylic resin described herein, and delivered to an injection pultrusion die.

The pultrusion process is carried out with a pultrusion injection die system 1 that includes a pultrusion die 20. In FIG. 1 composite fibers 4 wound on fiber roves 2 on a stand 3. The fibers 4 are unwound and then braided together via a fiber guide 5. The braided fibers 4 are then delivered to a resin bath 10 containing the liquid acrylic resin 12 described above after the inhibitor has been replaced with the nitro retarder and the polymerization initiator. Wet braided fibers 13 exit the resin bath 10 and enter the input port 24 on a pultrusion die 20. The pultrusion die 20 is similar to a common pultrusion die and includes a longitudinally aligned mold cavity 22 configured to heat and compress the wet braided fibers 13. Attached or assembled on the pultrusion die 20 is a plurality of sequentially aligned die heaters 32, 34, and 36 that gradually heat and cool the wet fibers 13 in the mold cavity 22, causing the resin and fibers to polymerization. In the embodiment shown in FIG. 1, three heaters 32, 34, and 36, are used. The first heater 32 increases the temperature to 60 degrees C., the second heater 34 increases the temperature to 110 degrees C. for optimal polymerization, and the third heater 36 decreases the temperature to 90 degrees C. to harden the cured composite. The system 1 includes pullers 45 that pull the wet braided fibers 13 and cured composite fibers 40 through the die 1, and cutters 50 that cut the cured composite fibers 40 into a desired composite pieces 60.

Figure 2:
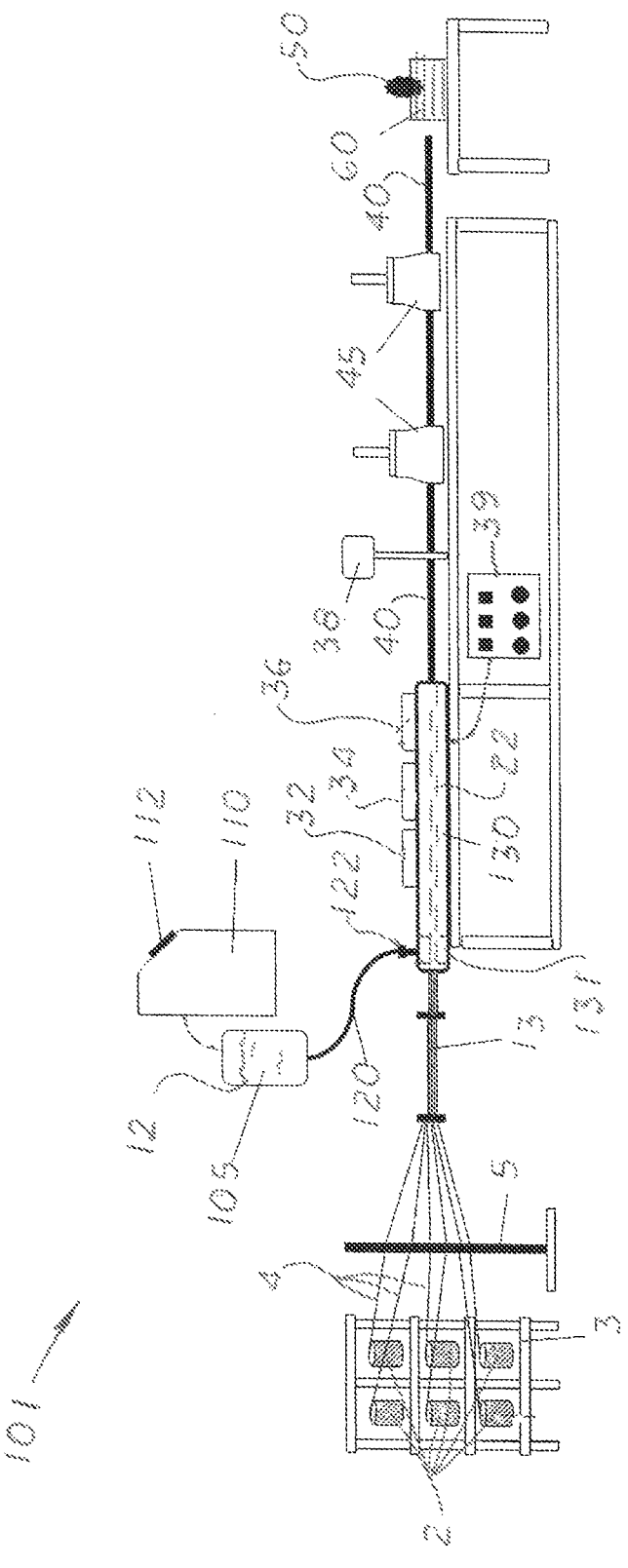
FIG. 2 illustrates another embodiment of a pultrusion system in which composite fibers are braided and delivered to a modified injection pultrusion die that includes a injection cavity in which braided fibers are impregnated with liquid acrylic resin stored in a resin tank.

FIG. 2 illustrates a second embodiment of a pultrusion system 101 in which composite fibers are braided and delivered to a modified pultrusion die 130 that connects a resin tank 105 containing the liquid acrylic resin 12. In a second embodiment, the resin bath 10 is replaced with a resin tank 106. Resin 12 (the inhibitor is replaced by the nitro retarder and the polymerization initiator) is delivered via a conduit 120 to an injection cavity 131 formed inside the pultrusion die 130. Inside the injection cavity 131, the resin 12 impregnates the braided fibers 4. Like the first embodiment of the die system, shown in FIG. 1, the injection pultrusion die 130 includes a longitudinally aligned compression mold cavity 22 and a plurality of sequentially aligned die heaters 32, 34, and 36 that gradually heat and cool the wet braided fibers 13 in the mold cavity 22 to optimize polymerization. The system 101 includes pullers 45 that pull the wet braided fibers 13 and the cured composite fibers 40 through the die 130, and cutters 50 that cut the cured composite fiber 40 into composite pieces 60.

In both the first and second die systems 1 and 101, one or more control panels 38, 39 or software programs control the temperatures of the die heaters 32, 34, and 36 and the pulling speed of the pullers 45 and the cutters 50. In the second die system, the same or additional control panels or software programs 110 and 112 are used to control the amount and flow rate of resin 12 from tank 105 into injection chamber 131.

The method disclosed here uses the same conditions used with conventional pultrusion of thermosets. The temperature values of the die heaters 32, 34, and 36 are set at between 60 degree C. and 110-degree C. A fiber-reinforced composite comprising Poly (methyl methacrylate)/nano clay nanocomposite matrix is obtained after the pultrusion. For comparison, the same machine is used to produce thermoset composite. For comparison, the same machine and conditions are used with 0.0% nano clay containing methacrylic resin.

Using the above resin and systems, a method for making composite structures made of thermoplastic nanocomposite/fiber-reinforced composite, is taught comprising the following steps:

a. forming a thermoplastic liquid resin made of 70-90%, methyl methacrylate, 10-30% polymeric viscosity-promoting agent, an inhibitor, and an internal lubricant;

b. removing said inhibitor from said thermoplastic liquid resin and replacing said inhibitor with a nitro retarder and a polymerization initiator;

c. selecting a pultrusion system that includes a pultrusion die, a braid fiber delivery system, a liquid resin impregnation system, a puller configured to pull impregnated fibers through said pultrusion die, and a cutter configured to cut said impregnated fiber when cured to a desired length, said pultrusion die includes a mold die and a plurality of heaters configured to apply heat to fibers impregnated with said liquid resin, that compresses and heats said wet fiber delivered thereto;

d. delivering a plurality of braided wet fibers to said mold cavity in said pultrusion die;

e. applying pressure and heat to said wet fibers to polymerize and then cooling said wet fibers to cure and hardened to form a composite;

f. pulling said composite from said pultrusion die using said pullers; and g. cutting said composite into desired lengths using said cutter.

As mentioned above, the advantage of using the resin and pultrusion systems described above is that the resin and polymers used to manufacture pultruded parts can be easily recovered and recycled using well-known solvents. Unlike standard recycling methods that require high temperatures, dangerous chemicals, and special equipment and facilities, such items are not required to recycle the resins and fiber at high temperatures, using the above-described resin and composite fibers. Companies can now recycle the resins and composite fibers easily 'in-house'. Also, because harsh chopping and grinding are not required in the recycling process, the lengths of the recovered fibers are relatively long (4-5 cm), making them more reusable.

In compliance with the statute, the invention described has been described in language more or less specific as to structural features. It should be understood however, that the invention is not limited to the specific features shown, since the means and construction shown, comprises the preferred embodiments for putting the invention into effect. The invention is therefore claimed in its forms or modifications within the legitimate and valid scope of the amended claims, appropriately interpreted under the doctrine of equivalents.

We claim:

1. A method for making composite structures made of thermoplastic nanocomposite/fiber-reinforced composite, comprising the following steps:

a. forming a liquid resin mixture comprising: 70-90 wt. % methyl methacrylate monomer containing a polymerization inhibitor, 10-30 wt. % polymeric viscosity-promoting agent, 0.1-10 wt. % nano clay, and an internal lubricant;

b. removing said polymerization inhibitor from said methyl methacrylate monomer;

c. mixing a nitro compound retarder into said liquid resin mixture after removing said polymerization inhibitor to stabilize said liquid resin against premature polymerization and thereby to form a thermoplastic liquid resin;

d. selecting a pultrusion injection die system including a pultrusion injection die defining a mold cavity, a braid fiber delivery system, a liquid resin impregnation system, a puller configured to pull impregnated fibers through said pultrusion injection die, and a cutter configured to cut a cured composite to a desired length;

e. impregnating a plurality of braided fibers with said thermoplastic liquid resin using said liquid resin impregnation system to form wetted braided fibers;

f. delivering said wetted braided fibers into said mold cavity of said pultrusion injection die;

g. applying pressure and heat to said wetted braided fibers within said mold cavity to polymerize said thermoplastic liquid resin and form a fiber-reinforced composite;

h. cooling said fiber-reinforced composite and thereafter pulling said cooled fiber-reinforced composite from said pultrusion injection die using said puller; and i. cutting said fiber-reinforced composite into desired lengths using said cutter.

2. The method for making composite structures made of thermoplastic nanocomposite/fiber-reinforced composite, as recited in claim 1, wherein said liquid resin impregnation system includes passing said braided fibers through a bath containing said thermoplastic liquid resin with said nitro compound retarder to form said wetted braided fibers.

3. The method for making composite structures made of thermoplastic nanocomposite/fiber-reinforced composite, as recited in claim 1, wherein said liquid resin impregnation system includes a resin tank containing said thermoplastic liquid resin with said nitro-compound retarder to create said wetted braided fibers.

4. The method of claim 1, further comprising recycling at least a portion of the fiber-reinforced composite or resin waste to produce a recycled material, and using the recycled material to prepare fresh liquid resin for use in forming additional fiber-reinforced composite structures.

5. The method of claim 4, wherein the recycling includes recovering fibers and polymer material from the fiber-reinforced composite for reuse in subsequent composite formation.

\* \* \* \* \*